United States Patent
Fullbeck et al.

(10) Patent No.: US 7,380,837 B2
(45) Date of Patent: Jun. 3, 2008

(54) FITTING FOR A SANITARY HOSE

(76) Inventors: Wolfgang F. Fullbeck, 23927 Gabbard Dr., Lawrenceburg, IN (US) 47025; Mark A. Hess, 10012 Sonya La., Cincinnati, OH (US) 45241

(*) Notice: Subject to any disclaimer, the term of this patent is extended or adjusted under 35 U.S.C. 154(b) by 164 days.

(21) Appl. No.: 11/242,251

(22) Filed: Oct. 3, 2005

(65) Prior Publication Data
US 2006/0028020 A1 Feb. 9, 2006

Related U.S. Application Data

(63) Continuation-in-part of application No. 10/703,232, filed on Nov. 7, 2003, now Pat. No. 7,066,497.

(51) Int. Cl.
*F16L 33/00* (2006.01)
(52) U.S. Cl. .................................. 285/256; 29/508
(58) Field of Classification Search ................ 285/256, 285/247, 245, 241; 29/508, 890.14
See application file for complete search history.

(56) References Cited

U.S. PATENT DOCUMENTS

| | | | |
|---|---|---|---|
| 1,684,713 A | 9/1928 | Norgren | |
| 2,029,846 A | 2/1936 | Von Henke | 285/86 |
| 2,171,945 A * | 9/1939 | Norgren | 285/256 |
| 2,319,586 A * | 5/1943 | Clench | 285/256 |
| 2,360,761 A | 10/1944 | Clickner | 285/84 |
| 2,371,971 A | 3/1945 | Main et al. | 285/84 |
| 2,479,499 A * | 8/1949 | Le Clair | 285/256 |
| 2,481,001 A * | 9/1949 | Burckle | 285/222.4 |
| 2,485,976 A * | 10/1949 | Main | 285/106 |
| 2,535,460 A * | 12/1950 | Rotter et al. | 285/222.4 |
| 2,648,549 A | 8/1953 | Woodward | 285/71 |
| 2,829,671 A * | 4/1958 | Ernst et al. | 285/245 |
| 2,848,254 A * | 8/1958 | Millar | 285/222.5 |
| 2,920,910 A * | 1/1960 | Schnabel | 285/222.4 |

(Continued)

FOREIGN PATENT DOCUMENTS

DE 20201874 5/2002

(Continued)

*Primary Examiner*—David E Bochna
(74) *Attorney, Agent, or Firm*—Wood, Herron & Evans, LLP

(57) ABSTRACT

A fitting for a sanitary hose assembly includes a rigid, tubular stem, a cylindrical ferrule, and an annular seal, which coact with the end of the hose to achieve a uniformly leakproof seal for a material flow path through the hose and into the fitting. One end of the ferrule extends over the outer end of the hose, such that the ferrule engages the hose and extends slightly beyond the hose. An inner end of the stem extends through an outer end of the ferrule and into the hose, such that the outer surface of the stem frictionally engages the internal surface of the hose. The stem has an outer end adapted to connect to a similar structure, internal threads which cooperatively engage similar threads on the ferrule, and an outwardly directed land adjacent the threads. The threaded coupling of the stem and the ferrule fixes their relative axial relationship, and also axially compresses the annular seal between. The ferrule is radially crimped to compress the end of the hose between the stem and the ferrule. This combination of components provides a circumferentially uniform and leakproof seal between the hose and the fitting, at relatively low cost.

10 Claims, 3 Drawing Sheets

U.S. PATENT DOCUMENTS

| | | | |
|---|---|---|---|
| 3,032,358 A | 5/1962 | Rolston | 285/247 |
| 3,177,016 A | 4/1965 | Holmgren | 285/247 |
| 3,246,921 A | 4/1966 | Lyon et al. | 285/247 |
| 3,347,571 A * | 10/1967 | New | 285/222.4 |
| 3,791,680 A | 2/1974 | Cleare | 285/174 |
| 3,820,825 A | 6/1974 | Morin | 285/39 |
| 3,838,873 A | 10/1974 | Gilbert | 285/174 |
| 4,046,451 A | 9/1977 | Juds et al. | 285/177 |
| 4,054,305 A | 10/1977 | Gajajiva et al. | 285/39 |
| 4,089,351 A | 5/1978 | Ward et al. | 138/109 |
| 4,150,466 A | 4/1979 | Horvath | 29/417 |
| 4,162,092 A | 7/1979 | Hayes | 285/39 |
| 4,165,106 A | 8/1979 | Gladden | 285/39 |
| 4,369,992 A | 1/1983 | Fournier et al. | 285/256 |
| 4,735,444 A | 4/1988 | Skipper | 285/286 |
| 4,850,620 A | 7/1989 | Puls | 285/174 |
| 4,871,198 A | 10/1989 | Hattori et al. | 285/373 |
| 4,893,848 A | 1/1990 | Melcher | 285/258 |
| 4,909,545 A | 3/1990 | Hohol | 285/39 |
| 4,915,426 A | 4/1990 | Skipper | 285/286 |
| 5,044,671 A * | 9/1991 | Chisnell et al. | 285/55 |
| 5,089,074 A | 2/1992 | Winter et al. | 156/244.13 |
| 5,129,686 A | 7/1992 | Sanders et al. | 285/258 |
| 5,172,943 A | 12/1992 | Shimada | 285/323 |
| 5,176,411 A | 1/1993 | DuPont, Jr. et al. | 285/249 |
| 5,240,291 A * | 8/1993 | Zornow | 285/40 |
| 5,263,747 A | 11/1993 | Lefebvre et al. | 285/226 |
| 5,317,799 A | 6/1994 | Chapman et al. | 29/508 |
| 5,349,988 A | 9/1994 | Walsh et al. | 138/107 |
| 5,393,104 A * | 2/1995 | Zornow | 285/40 |
| 5,398,977 A | 3/1995 | Berger et al. | 285/133.1 |
| 5,413,147 A | 5/1995 | Moreiras et al. | 138/109 |
| 5,423,578 A | 6/1995 | Kanomata et al. | 285/315 |
| 5,486,023 A | 1/1996 | Sanders et al. | 285/258 |
| 5,566,983 A | 10/1996 | Gluys et al. | 285/14 |
| 5,622,393 A | 4/1997 | Elbich et al. | 285/245 |
| 5,638,869 A | 6/1997 | Zaborszki et al. | 138/109 |
| 5,687,994 A | 11/1997 | Hansen | 285/12 |
| 5,689,852 A | 11/1997 | Svoboda et al. | 15/405 |
| D396,730 S | 8/1998 | Schaupp | D23/259 |
| 5,857,716 A | 1/1999 | Thomas | 285/143.1 |
| 5,860,678 A | 1/1999 | Urzua | 285/40 |
| 5,884,945 A | 3/1999 | Bader et al. | 281/222.5 |
| 5,911,448 A | 6/1999 | Feher | 285/222.5 |
| 5,988,226 A | 11/1999 | Matthews | 138/109 |
| 6,016,842 A | 1/2000 | Rooke | 138/109 |
| 6,017,066 A | 1/2000 | Giuffre | 285/38 |
| 6,036,237 A | 3/2000 | Sweeney | 285/322 |
| 6,102,442 A | 8/2000 | Gretz | 285/40 |
| 6,102,445 A | 8/2000 | Thomas | 285/139.1 |
| 6,260,584 B1 | 7/2001 | Foti | 138/109 |
| 6,276,728 B1 | 8/2001 | Treichel | 285/382.7 |
| 6,364,368 B1 | 4/2002 | Kilgore | 285/251 |
| 6,378,914 B1 | 4/2002 | Quaranta | 285/256 |
| 6,412,484 B1 * | 7/2002 | Izuchukwu et al. | 128/205.22 |
| 6,428,052 B1 | 8/2002 | Albino et al. | 285/23 |
| 6,592,153 B1 | 7/2003 | Belcher | 285/222.2 |
| 2002/0079702 A1 | 6/2002 | Baumann et al. | |
| 2002/0185866 A1 | 12/2002 | Bowman | |

FOREIGN PATENT DOCUMENTS

| | | | |
|---|---|---|---|
| EP | 0332853 | 9/1989 | |
| EP | 474114 | 3/1992 | |
| EP | 0829670 | 3/1998 | |
| FR | 2144147 | 2/1973 | |
| GB | 718261 | 11/1954 | 99/1 |
| GB | 1476065 | 6/1977 | |
| WO | WO02/061322 | 8/2002 | |
| WO | WO2005047750 | 5/2005 | |

* cited by examiner

FITTING FOR A SANITARY HOSE

This application is a continuation-in-part of application Ser. No. 10/703,232, filed Nov. 7, 2003, now U.S. Pat. No. 7,066,497, the disclosure of which is hereby incorporated by reference herein in its entirety.

FIELD OF THE INVENTION

The present invention pertains generally to fittings for hose, pipe and other conduits, and more particularly to a hose fitting for use in applications where maintaining sanitary conditions is required.

BACKGROUND OF THE INVENTION

Various fittings are known in the art for coupling the end of a flexible hose or conduit to a corresponding hose or other device. In certain applications, the hose fittings must meet stringent sanitary requirements. Such applications include dairy processing, food and beverage processing and delivery, pharmaceutical manufacture, and other similar applications. When a flexible hose or conduit must be used in a sanitary environment, it is particularly important that the fittings provide a sealed connection that does not pose a potential for contamination of the materials transported through the hose, for example, by exposure to bacteria or other contaminants. Previous fittings for use in sanitary applications have included permanent-type fittings which are vulcanized or directly molded or crimped to suitable sanitary hoses, or removable-type fittings which are either clamped or threadably secured to sanitary hoses. Conventional vulcanized and crimped fittings generally require precise setup and complicated fixturing to attach the fitting to the hose. The labor intensive setup increases manufacturing cost and cycle times for producing hose sets. Conventional removable fittings with threaded components are often difficult to threadably tighten while compressing the hose between respective components and are typically unable to handle high pressures. Moreover, removable fittings can be taken apart by persons not trained to properly service the fittings, thereby increasing the risk that the fittings will be reassembled incorrectly.

A need therefore exists for a sanitary hose fitting which addresses these and other drawbacks of the prior art.

SUMMARY OF THE INVENTION

The present invention meets the need for a permanent sanitary hose fitting suitable for use in applications where sanitary conditions must be maintained. The fitting includes a rigid, elongated, tubular stem with one end configured to be inserted within a sanitary hose. The other end of the stem is adapted to mate with a corresponding fitting surface. An annular sealing member is sized to be received on a land formed onto an outer surface of the stem. The fitting further includes a ferrule configured to be received over the end of the hose and to be radially crimped to the hose to radially compress and secure the end of the hose between the ferrule and the stem.

The ferrule and stem have corresponding circumferential threads to enable threadably securing the ferrule to the stem prior to crimping. This threaded connection fixes the relative axial positions of the ferrule and stem prior to and during crimping, and effectively couples the stem and ferrule together as a single, integrated unit. The ferrule has first and second ends with respective first and second outer diameters. The outer diameter of the second end is sized to be initially greater than the outer diameter of the first end. During crimping, the outer diameter of the second end is deformed such that it is approximately equal to the diameter of the first end.

The invention also contemplates a method of coupling a fitting to the end of the hose and a hose assembly made by this process. The method includes threadably coupling a ferrule and a stem to axially compress an annular seal disposed therebetween, inserting the end of the hose over the stem and into the ferrule, and then radially crimping the ferrule to radially compress and secure the hose between the ferrule and stem. This method produces a safe and secure connection between the hose and the fitting, around the entire circumference of the assembly.

The features and objectives of the present invention will become more readily apparent from the following detailed description and the accompanying drawings.

DETAILED DESCRIPTION

Figure 1:
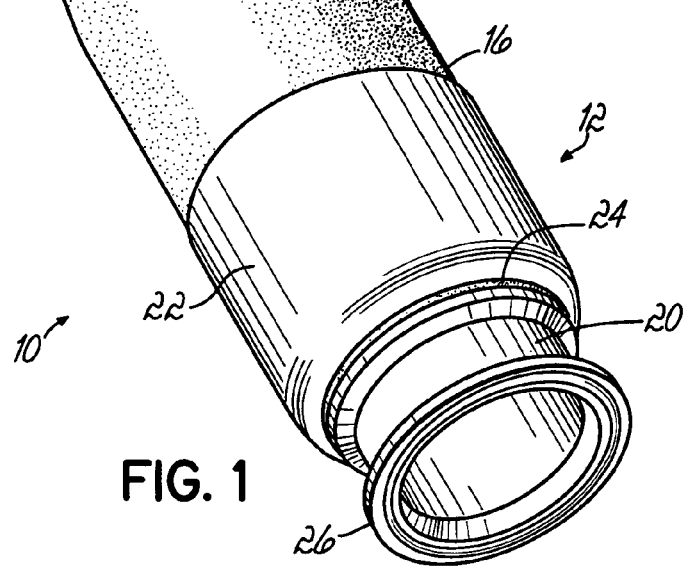
FIG. 1 is a perspective view of an exemplary sanitary hose and fitting according to one embodiment of the present invention.

FIG. 1 depicts an exemplary sanitary hose assembly 10 with a two-piece fitting 12 according to the present invention. The hose assembly 10 includes a sanitary hose 14 having a first, free end 16 configured to sealingly connect to the two-piece fitting 12. The hose 14 is suitable for use in sanitary environments and may be formed from polymeric materials, in either a unitary or composite construction, as known in the art. The fitting 12 includes an elongated tubular stem 20, an outer cylindrical ferrule 22 threadably connected to the stem 20, and an annular sealing member 24 compressibly disposed therebetween. The fitting 12 holds the first end 16 of the hose 14 radially between the ferrule 22 and the stem 20, and the ferrule is radially crimped to compress the first end 16 of the hose 14 therebetween.

Figure 2C:
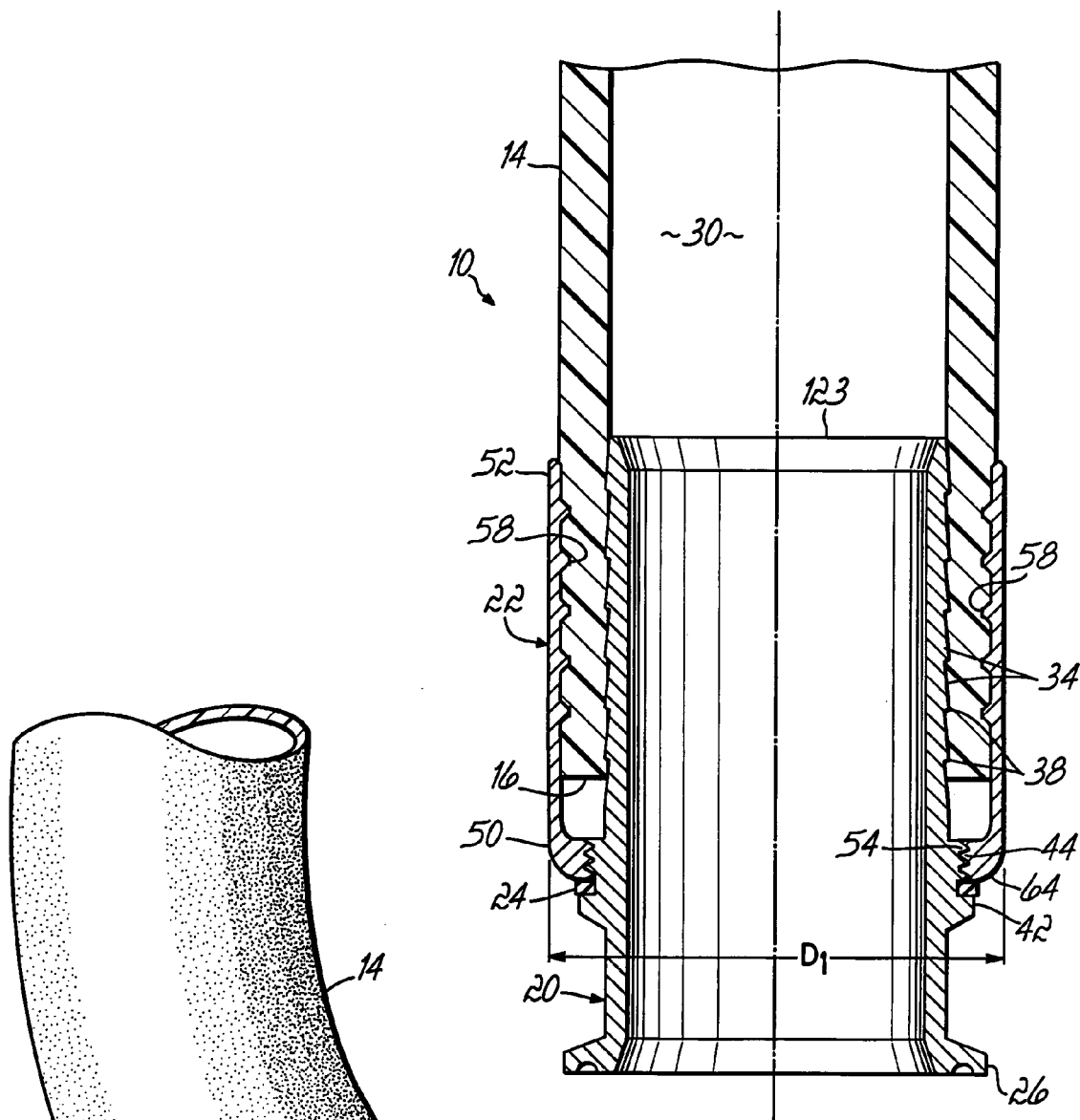
FIG. 2C is a cross-sectional view of the hose and fitting, similar to FIG. 2B, after crimping.
Figure 2A:
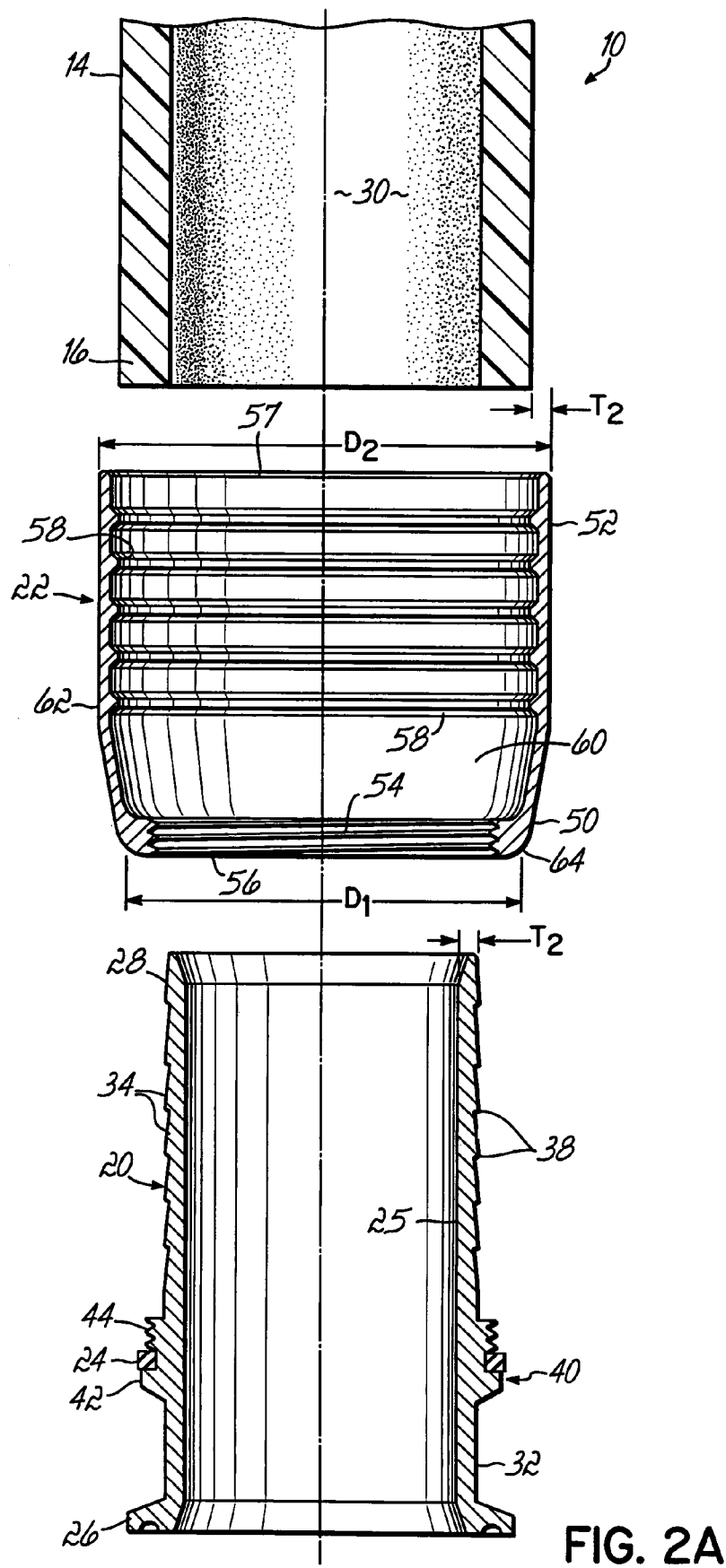
FIG. 2A is an exploded cross-sectional view of the sanitary hose and fitting of FIG. 1.
Figure 2B:
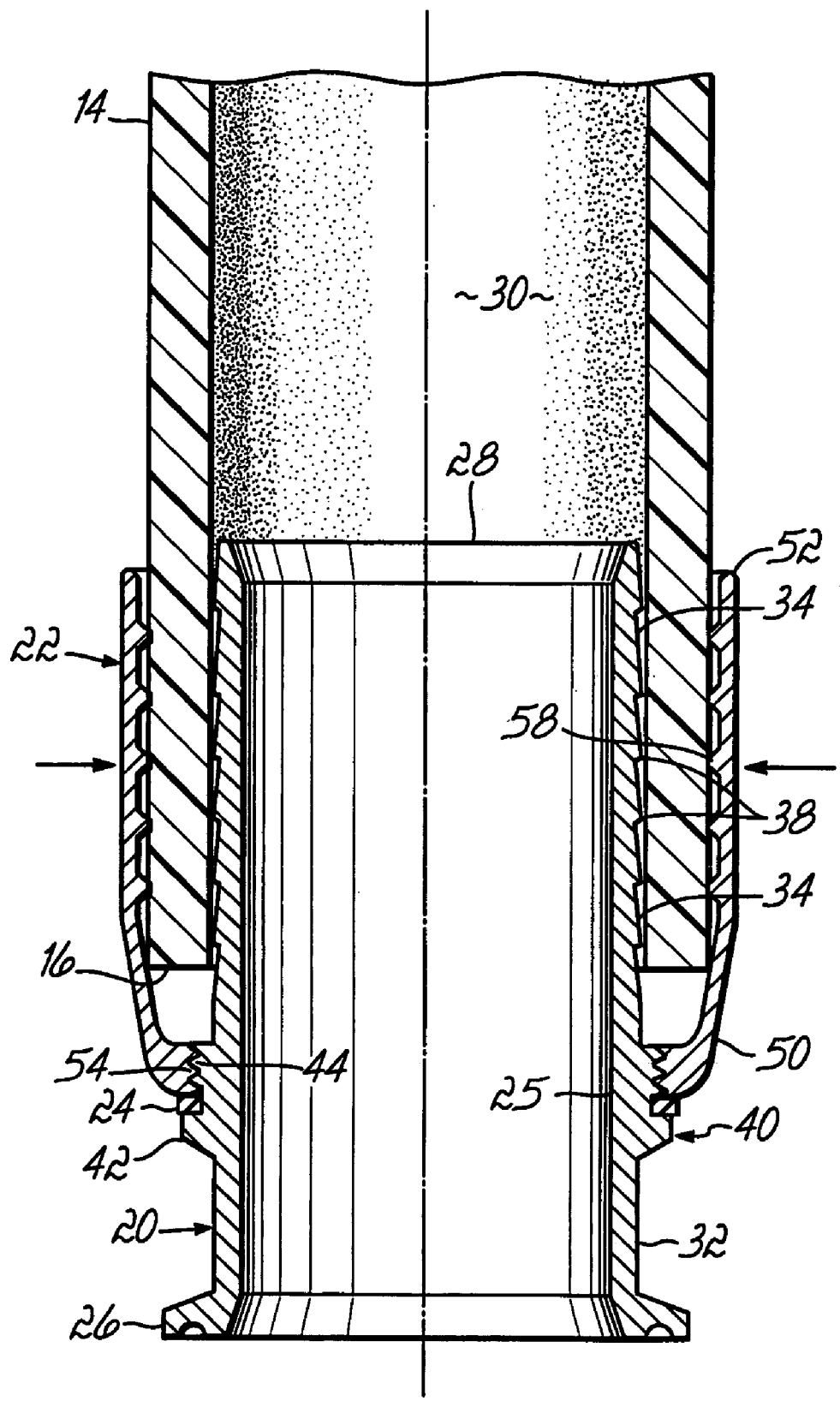
FIG. 2B is a cross-sectional view of the hose and fitting of FIG. 1 prior to crimping.

FIGS. 2A and 2B show the hose assembly 10 in greater detail. The elongate, tubular stem 20 has a first end 26 adapted to mate with a corresponding fitting surface (not shown), such as the mounting flange of a machine, or a coupling for joining the hose assembly 10 to another hose or conduit. It will be recognized that the first end 26 of the stem 20 may be adapted to mate with any configuration of corresponding fitting surface, as may be desired, and the first end 26 is not limited to the particular configuration shown in the figures. A second end 28 of the stem 20 is sized and shaped to be received within the interior 30 of the sanitary hose 14. In use, an axial bore 25 through the stem 20 communicates with the interior 30 of the hose to allow movement of material from the hose 14 and through the fitting 12.

In one embodiment, the radially outwardly directed surface 32 of the stem 20 fits snug against the interior surface of the hose 14 prior to crimping the ferrule 22, as described below. To increase the holding ability of the fitting 12 on the end 16 of the hose 14, the outer surface 32 of the stem 20 may include one or more annular barbs 34, near the second end 28. FIG. 2A shows the barbs 34 as tapered surfaces extending around the outer circumference of the stem 20. Each barb 34 includes a leading edge 38 for engaging the inner surface of the hose 14. It will be understood that the barbs 34 may be shaped in any other configuration suitable for engaging the inner surface of the hose 14 and resisting withdrawal of the stem 20 from the hose 14.

An intermediate section 40 of the stem 20, between the first and second ends 26, 28, includes a radially outwardly extending land 42 configured to locate the annular seal 24, such as an o-ring, adjacent thereto. The intermediate section 40 further includes external threads 44 formed on the outer surface 32 of the stem 20, to facilitate threadable coupling of the stem 20 and the ferrule 22.

The fitting 12 further includes a rigid, tubular ferrule 22 having a first end 50 with a first aperture 56 that is configured to receive the second end 28 of the stem 20 therethrough, and a second end 52 with a second aperture 57 configured to receive the first end 16 of the flexible hose 14. Accordingly, the second end 28 of the stem 20 may be inserted through the first end 50 of the ferrule 22 and into the end 16 of the hose 14, as depicted in FIG. 2B, whereafter the end 16 of the hose 14, may be crimped between the ferrule 22 end stem 20 as depicted in FIG. 2C. As used herein, "crimping" means the radial deformation of a workpiece, such as the ferrule 22, in a radially inward direction by application of radially compressive forces. This is distinguished from "swaging" which is the deformation of a workpiece accomplished by forcing the workpiece through a constriction die. It has been determined that, due to the properties of softer materials typically used in swaging operations, crimped ferrules exhibit better hose retaining characteristics than corresponding swaged fittings. Moreover, crimping the ferrule 22 to the hose 14 requires fewer steps to achieve the same reduction in outer diameter of a workpiece, compared to swaging, and is therefore a more efficient process.

The first end 50 of the ferrule 22 further includes internal threads 54, formed into the first aperture 56. The threads 54 on the ferrule 22 correspond to the external threads 44 formed on the intermediate section 40 of the stem 20, whereby the ferrule 22 and stem 20 may be threadably coupled together during assembly of the fitting 12, as depicted in FIG. 2B. The ferrule 22 may further include one or more inwardly extending circumferential ribs 58 formed along the interior surface 60 of the ferrule, proximate the second end 52. The circumferential ribs 58 are pressed into the sidewall of the hose 14 when the ferrule 22 is crimped, and cooperate with the barbs 34 formed on the stem 20 to help retain the fitting 12 on the end 16 of the hose 14. While the ribs 58 shown and described herein extend continuously and circumferentially around the interior surface 50 of the ferrule 22, it will be recognized the ribs may alternatively comprise individual segments or protrusions extending radially inwardly from the interior surface 60, or may be configured in a spiraling arrangement, similar to screw threads.

As depicted in FIGS. 2A and 2B, the ferrule 22 is formed such that the second end 52 of the ferrule 22 has an outer diameter D2 which is initially greater than the outer diameter D1 at the first end 50 of the ferrule 22. Accordingly, the inner and outer surfaces 60, 62 of the ferrule 22 taper along the length of the ferrule 22 between the first and second ends 50, 52. This configuration of the ferrule 22 facilitates installation of the ferrule 22 and stem 20 onto the end 16 of the hose 14. The second end 52 of the ferrule 22 is thereafter crimped to deform the second diameter D2 such that it becomes approximately equal to the first diameter D1, thereby compressing the first end 16 of the hose 14 between the ferrule 22 and the stem 20, as depicted in FIG. 2C.

While the ferrule 22 has been shown and described herein as having a second outer diameter D2 that is initially greater than the first outer diameter D1, it will be recognized that the ferrule 22 may alternatively be formed with a uniform outer diameter sized to be received over the hose 14, whereafter the entire length of the ferrule 22 may be crimped to secure the fitting 12 to the hose 14 in a manner similar to that described above.

In general, the ferrule 22 should be crimped an amount sufficient to compress the hose 14 such that the hose 14 is retained by the fitting 12 while avoiding puncturing or otherwise damaging the hose 14. In one embodiment, the ferrule 22 is crimped an amount sufficient to compress the hose 14 up to approximately 15% to 25% of its uncompressed wall thickness. In order to maintain a sufficient crimp, the ferrule 22 should be made from a material which is not too soft. In an exemplary embodiment, the material of the ferrule 22 has a hardness of at least 150, as measured by a Brinnel hardness test.

While the geometry of the stem 20 may be varied to accommodate differently sized hoses, the wall thickness T1 of the second end 28 of the stem 20 should be sufficient to withstand the crimping pressure. In the exemplary embodiment, the wall thickness T1 of the second end 28 of the stem 20 is not less than approximately ⅛ inch. Likewise, the wall thickness T2 of the ferrule 22 should not be excessively large, to thereby avoid excessive crimp forces necessary to crimp the ferrule 22. In an exemplary embodiment, the wall thickness T1 of the ferrule 22 is not greater than approximately 0.06 to 0.10 inch.

To assemble the fitting 12 to the end 16 of a sanitary hose 14, the second end 28 of the stem 20 is inserted through the first aperture 56 of the ferrule 22. The ferrule 22 is then secured to the stem 20 by threading internal threads 54 at the first end 50 of the ferrule 22 to the corresponding threads 44 formed into the intermediate section 40 of the stem 20. As the ferrule 22 is threaded onto the stem 20, the annular sealing member 24 disposed on the land 42 of the intermediate section 40 is compressed therebetween. To ensure adequate compression of the annular sealing member 24, the first end 50 of the ferrule 22 has a peripheral surface 64 with a generally convex, radiused profile that provides sufficient surface area to engage and compress the annular sealing member 24.

Once the ferrule 22 and stem 20 have been threadably secured, the end 16 of the hose 14 is placed over the second end 28 of the stem 20 and into the second aperture 57 of ferrule 22 such that the end 16 of the hose 14 extends within the interior 60 of the ferrule 22 toward the first end 50. The second end 52 of the ferrule 22 is then crimped to compress the end 16 of the hose 14 between the ferrule 22 and the second end 28 of the stem 20, as depicted in FIG. 2C. Once crimped, the fitting 12 provides a fluid-tight joint between the fitting 12 and the hose 14 that is suitable for use in sanitary applications.

In one embodiment, a portion of the annular sealing member 24 remains visible after the fitting 12 has been assembled and crimped to the hose 14. Accordingly, presence of the annular sealing member 24 is readily verified by visual inspection of the completed hose assembly 10.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A sanitary hose fitting comprising:
    an elongated tubular stem;
    a ferrule; and
    an annular seal compressibly disposed between said stem and said ferrule;
    said stem comprising:
        a first end adapted to engage a corresponding fitting surface,
        a second end configured to engage the inner diameter of a hose,
        an intermediate section between said first and second ends, said intermediate section comprising a land formed on an outer surface thereof and sized to support said annular sealing member, said intermediate section further comprising external threads formed on said outer surface, and
        an axial bore through said stem, between said first and second ends of said stem;
    said ferrule comprising:
        a first end having an outer diameter and a first aperture sized to receive said second end of said stem, said first end of said ferrule configured to engage said annular sealing member when said ferrule is coupled to said stem,
        a second end having a second aperture sized to receive the end of the hose, and having a second outer diameter sized to be initially greater than said first outer diameter and subsequently deformed to be approximately equal to said first outer diameter during attachment of the fitting to the hose, and
        internal threads disposed on said first end of said ferrule and configured to engage said external threads on said stem to thereby threadably couple said stem and said ferrule;
    wherein said ferrule has a peripheral surface with a generally convex profile at said second end thereof, said annular seal residing axially between said land and said peripheral surface.

2. A sanitary hose fitting comprising:
    an elongated tubular stem;
    a ferrule; and
    an annular seal compressibly disposed between said stem and said ferrule;
    said stem comprising:
        a first end adapted to engage a corresponding fitting surface,
        a second end configured to engage the inner diameter of a hose,
        an intermediate section between said first and second ends, said intermediate section comprising a land formed on an outer surface thereof and sized to support said annular sealing member, said intermediate section further comprising external threads formed on said outer surface, and
        an axial bore through said stem, between said first and second ends of said stem;
    said ferrule comprising:
        a first end having an outer diameter and a first aperture sized to receive said second end of said stem, said first end of said ferrule configured to engage said annular sealing member when said ferrule is coupled to said stem,
        a second end having a second aperture sized to receive the end of the hose, and having a second outer diameter greater than said first outer diameter and capable of being subsequently deformed to be approximately equal to said first outer diameter during attachment of the fitting to the hose, and
        internal threads disposed on said first end of said ferrule and configured to engage said external threads on said stem to thereby threadably couple said stem and said ferrule;
    wherein said ferrule is crimped to compress the hose up to approximately 15% to approximately 25% of its radial wall thickness.

3. A sanitary hose fitting comprising:
    an elongated tubular stem;
    a ferrule; and
    an annular seal compressibly disposed between said stem and said ferrule;
    said stem comprising:
        a first end adapted to engage a corresponding fitting surface,
        a second end configured to engage the inner diameter of a hose,
        an intermediate section between said first and second ends, said intermediate section comprising a land formed on an outer surface thereof and sized to support said annular sealing member, said intermediate section further comprising external threads formed on said outer surface, and
        an axial bore through said stem, between said first and second ends of said stem;
    said ferrule comprising:
        a first end having an outer diameter and a first aperture sized to receive said second end of said stem, said first end of said ferrule configured to engage said annular sealing member when said ferrule is coupled to said stem,
        a second end having a second aperture sized to receive the end of the hose, and having a second outer diameter initially greater than said first outer diameter and capable of being subsequently deformed to be approximately equal to said first outer diameter during attachment of the fitting to the hose, and
        internal threads disposed on said first end of said ferrule and configured to engage said external threads on said stem to thereby threadably couple said stem and said ferrule;
    wherein said stem further comprises circumferentially extending barbs formed on an outer surface thereof, between said intermediate section and said second end.

4. A method of coupling a fitting to the end of a hose, the fitting comprising a cylindrical ferrule, a tubular stem, and an annular seal, the method comprising:
    inserting a first end of the stem into and through a second end of the ferrule, the stem and ferrule including corresponding circumferential threads, and one of the stem and the ferrule including a land located adjacent the respective threads, the annular seal residing axially between the land and the threads;
    threadably connecting the ferrule and the stem via the respective threads, thereby to axially fix the respective positions of the stem and the ferrule and to axially compress the seal between the ferrule and the stem;

placing a first end of the ferrule over the end of the hose such that a second end of the ferrule extends beyond the end of the hose; and radially crimping the ferrule to radially compress the end of the hose residing between the ferrule and the stem, thereby to achieve a circumferentially secure fluid connection between the hose and the fitting.

5. The method of claim 4, wherein the land is formed on the stem adjacent the second end thereof, the threads of the stem are externally directed, and the threads of the ferrule are internally directed.

6. A sanitary hose coupling made according to the method of claim 5.

7. A sanitary hose coupling made according to the method of claim 4.

8. A method of coupling a fitting to the end of a hose, the fitting comprising a cylindrical ferrule, a tubular stem, and an annular seal, the method comprising:

inserting a first end of the stem into and through a second end of the ferrule, the stem and ferrule including corresponding circumferential threads, and one of the stem and the ferrule including a land located adjacent the respective threads, the annular seal residing axially between the land and the threads;

threadably connecting the ferrule and the stem via the respective threads, thereby to axially fix the respective positions of the stem and the ferrule and to axially compress the seal between the ferrule and the stem;

placing a first end of the ferrule over the end of the hose such that a second end of the ferrule extends beyond the end of the hose; and radially crimping the ferrule to radially compress the end of the hose residing between the ferrule and the stem, thereby to achieve a circumferentially secure fluid connection between the hose and the fitting;

wherein the ferrule in a pre-crimped condition has a taper extending axially from the first end to the second end, wherein crimping the ferrule eliminates the taper.

9. A sanitary hose assembly comprising:

a hose having an outer surface and a first end;

a rigid tubular stem having a first end operatively connectable to a corresponding structure and a second end receivably held within said first end of said hose, said hose and said stem defining a material flow path therethrough, said stem further including an outwardly extending circumferential land and externally directed threads located adjacent said land;

a cylindrical ferrule having a first end that circumferentially surrounds and engages said outer surface of said first end of said hose into which said second end of said stem is receivably held, said ferrule having a second end located beyond said first end of said hose, said ferrule having internally directed threads located at said second end thereof which threadably engage said externally directed threads of said stem, thereby to fix relative axial positions of said stem and said ferrule, said ferrule being radially crimped so as to radially compress and hold said first end of said hose between said stem and said ferrule; and an annular seal residing between said circumferential land and said first end of said ferrule, said seal being axially compressed between said land and said ferrule when said ferrule is threadably connected to said stem, thereby to securely seal said first end of said hose to said fitting and to provide a circumferentially leakproof material flow path.

10. The hose assembly of claim 9, said first end of said ferrule is formed with an outer diameter that is initially greater than an outer diameter of said second end of said ferrule, and after being crimped to said hose said outer diameter of said first end of said ferrule is substantially the same as said outer diameter of said second end.

* * * * *

UNITED STATES PATENT AND TRADEMARK OFFICE
CERTIFICATE OF CORRECTION

PATENT NO. : 7,380,837 B2  Page 1 of 1
APPLICATION NO. : 11/242251
DATED : June 3, 2008
INVENTOR(S) : Fullbeck et al.

It is certified that error appears in the above-identified patent and that said Letters Patent is hereby corrected as shown below:

Column 3
Lines 24-25, reads "end 16 of the hose 14, may be crimped between the ferrule 22 end stem 20 as depicted in" and should read -- end 16 of the hose 14 may be crimped between the ferrule 22 and stem 20 as depicted in --.

Column 5
Line 8, reads "spirit of Applicant's" and should read -- spirit of Applicants' --.

Column 8
Line 29, CLAIM 10, reads "The hose assembly of claim 9, said first end of" and should read -- The hose assembly of claim 9, wherein said first end of --.

Signed and Sealed this

Seventeenth Day of March, 2009

JOHN DOLL
*Acting Director of the United States Patent and Trademark Office*